(12) United States Patent
Matzen (10) Patent No.: US 11,166,448 B2
(45) Date of Patent: Nov. 9, 2021

(54) ANIMAL TRAP

(71) Applicant: The Rickey Mouse Company, LLC, Carefree, AZ (US)

(72) Inventor: Tracy M. Matzen, Carefree, AZ (US)

(73) Assignee: The Rickey Mouse Company, LLC, Carefree, AZ (US)

( * ) Notice: Subject to any disclaimer, the term of this patent is extended or adjusted under 35 U.S.C. 154(b) by 62 days.

(21) Appl. No.: 16/455,864

(22) Filed: Jun. 28, 2019

(65) Prior Publication Data

US 2019/0320642 A1    Oct. 24, 2019

Related U.S. Application Data

(63) Continuation-in-part of application No. 15/683,142, filed on Aug. 22, 2017.

(51) Int. Cl.
*A01M 23/04*    (2006.01)
*A01M 23/08*    (2006.01)
(Continued)

(52) U.S. Cl.
CPC ............ *A01M 23/04* (2013.01); *A01M 23/08* (2013.01); *A01M 23/10* (2013.01); *A01M 23/24* (2013.01)

(58) Field of Classification Search
CPC ...... A01M 23/04; A01M 23/06; A01M 23/02; A01M 23/08; A01M 23/14; A01M 23/16; A01M 23/18
(Continued)

(56) References Cited

U.S. PATENT DOCUMENTS

| 76,289 | A | * | 3/1868 | Starr | ................ | A01M 21/00 |
| | | | | | | 43/70 |
| 146,284 | A | * | 1/1874 | Schweizer | ........... | A01M 23/04 |
| | | | | | | 43/69 |

(Continued)

FOREIGN PATENT DOCUMENTS

| CH | 672709 | 12/1989 | | |
| CH | 672709 A5 | * 12/1989 | ............ | A01M 23/06 |

(Continued)

OTHER PUBLICATIONS

Matthias Wandel, "Building a better mouse trap, with video surveillance", Woodgears.ca, Aug. 10, 2017, https://web.archive.org/web/20170810032052/http://woodgears.ca/farm/mousetrap.html.

(Continued)

*Primary Examiner* — Darren W Ark
(74) *Attorney, Agent, or Firm* — Woods Oviatt Gilman LLP; Ronald J. Kisicki, Esq.

(57) ABSTRACT

An animal trap apparatus having a collection of individual components is mounted onto a rim of a bucket and comprises a plank having a bait receiving end and a mounting end, with a fulcrum feature therebetween. The fulcrum feature may have a non-circular cross section. A bracket with a notch is received by the rim of the bucket while a receiving feature having an occluded open end is configured to receive the fulcrum feature. In use, the plank is configured to pivot about the fulcrum feature in a forward direction when an animal approaches the bait receiving end thereby placing the animal trap apparatus in a tripped condition whereby the bait receiving extends downwardly toward the closed bottom of the bucket and the animal falls into the cavity. The individual components may be formed of a food-grade material.

10 Claims, 7 Drawing Sheets

(51) Int. Cl.
*A01M 23/10* (2006.01)
*A01M 23/24* (2006.01)

(58) Field of Classification Search
USPC ....... 43/69–72, 74, 64, 60, 61; 472/106, 115
See application file for complete search history.

(56) References Cited

U.S. PATENT DOCUMENTS

| | | | | |
|---|---|---|---|---|
| 514,521 | A * | 2/1894 | Tornblom | A63G 11/00 472/106 |
| 585,045 | A * | 6/1897 | Pelton | A01M 23/04 43/69 |
| 620,551 | A * | 2/1899 | Porter | E05D 7/1077 16/257 |
| 782,428 | A * | 2/1905 | Struble | E05D 7/1066 16/267 |
| 1,272,974 | A * | 7/1918 | Lycan | A01M 23/04 43/69 |
| 1,420,384 | A * | 6/1922 | Pierini | A01M 23/04 43/69 |
| 1,466,178 | A * | 8/1923 | Lange | A01M 23/06 43/69 |
| 1,500,525 | A * | 7/1924 | Humbert | A01M 23/04 43/69 |
| 1,520,557 | A * | 12/1924 | Berg | A01M 23/06 43/69 |
| 1,552,855 | A * | 9/1925 | Jenkins | A01M 23/00 43/69 |
| 1,636,745 | A * | 7/1927 | Johnson | A01M 23/18 43/69 |
| 1,831,688 | A * | 11/1931 | Snider | A01M 23/04 43/70 |
| 1,889,276 | A * | 11/1932 | Dorrien | A01M 23/18 43/69 |
| 2,122,147 | A * | 6/1938 | Lamp | A01M 23/04 43/67 |
| 2,431,138 | A * | 11/1947 | Ressinger | A47D 13/105 472/112 |
| 2,619,765 | A * | 12/1952 | Sees | A01M 23/12 43/64 |
| 2,741,866 | A * | 4/1956 | Shirley | A01M 23/04 43/69 |
| 2,825,995 | A * | 3/1958 | Snider | A01M 23/06 43/69 |
| 2,850,835 | A * | 9/1958 | Scheidegger | A01M 23/14 43/70 |
| 3,528,191 | A * | 9/1970 | Hand | A01M 23/10 43/64 |
| 3,936,972 | A * | 2/1976 | Meyers | A01M 23/04 43/69 |
| 4,142,320 | A * | 3/1979 | Marcolina | A01M 23/02 43/61 |
| 4,363,184 | A * | 12/1982 | Marcolina | A01M 23/16 43/85 |
| 4,662,101 | A * | 5/1987 | Fisher | A01M 23/04 43/69 |
| 4,706,408 | A * | 11/1987 | Mellard | A01M 23/04 43/69 |
| 4,782,620 | A * | 11/1988 | Syszczyk | A01M 23/18 43/61 |
| 4,787,170 | A * | 11/1988 | Kingsbury | A01M 23/18 43/58 |
| 4,876,821 | A * | 10/1989 | Benzie | A01M 23/04 43/69 |
| 5,517,784 | A * | 5/1996 | Sedore | A01M 23/04 43/64 |
| 5,528,852 | A * | 6/1996 | Sarff | A01M 23/10 43/64 |
| 5,611,171 | A | 3/1997 | Hershey | |
| 5,996,274 | A * | 12/1999 | Smith | A01M 23/10 43/64 |
| 6,739,086 | B1 | 5/2004 | Lamb | |
| 6,772,557 | B2 * | 8/2004 | Laskey | A01M 1/026 43/124 |
| 7,543,406 | B2 * | 6/2009 | Wolfgram | A01M 23/08 43/61 |
| 7,627,981 | B1 * | 12/2009 | Doster | A01M 23/10 242/599.1 |
| 7,793,460 | B2 * | 9/2010 | Ha | A01M 23/18 43/61 |
| 7,841,130 | B2 * | 11/2010 | Blau | A01M 23/08 43/66 |
| 8,186,098 | B1 * | 5/2012 | Wilson | A01M 23/06 43/69 |
| 8,839,550 | B2 * | 9/2014 | Gardner | A01M 23/16 43/61 |
| 9,565,849 | B1 * | 2/2017 | Cassens | A01M 23/08 |
| 10,264,780 | B1 * | 4/2019 | Geesey | A01M 23/04 |
| 10,278,378 | B1 * | 5/2019 | Wallendorff | A01M 23/02 |
| 10,383,325 | B2 * | 8/2019 | Moga | A01M 23/02 |
| 10,945,425 | B2 * | 3/2021 | Matzen | A01M 23/04 |
| 2002/0104255 | A1 * | 8/2002 | Hobson | A01M 1/02 43/114 |
| 2004/0025410 | A1 * | 2/2004 | Shapland | A01M 23/12 43/65 |
| 2006/0026893 | A1 * | 2/2006 | Sears | A01M 23/04 43/69 |
| 2007/0017148 | A1 | 1/2007 | Blau | |
| 2010/0132244 | A1 * | 6/2010 | Ridge | A01M 23/10 43/71 |
| 2016/0286783 | A1 * | 10/2016 | Snell | A01M 25/004 |
| 2018/0325093 | A1 * | 11/2018 | Vickery | A01M 23/18 |
| 2019/0059353 | A1 * | 2/2019 | Matzen | A01M 23/04 |
| 2019/0320642 | A1 | 10/2019 | Matzen | |

FOREIGN PATENT DOCUMENTS

| | | | | |
|---|---|---|---|---|
| DE | 351978 | | 4/1922 | |
| DE | 351978 | C * | 4/1922 | ........... A01M 23/06 |
| DE | 29709597 | | 8/1997 | |
| DE | 29709597 | U1 * | 8/1997 | ........... A01M 23/04 |
| DE | 102004053106 | B3 * | 3/2006 | ........... A01M 23/20 |
| DE | 102008033858 | | 1/2010 | |
| DE | 102013007787 | | 11/2014 | |
| DE | 102013007787 | A1 * | 11/2014 | ........... A01M 23/04 |
| FR | 2038564 | | 1/1971 | |
| FR | 2038564 | A5 * | 1/1971 | ........... A01M 23/04 |
| FR | 2537837 | A1 * | 6/1984 | ........... A01M 23/04 |
| FR | 2563083 | | 10/1985 | |
| FR | 2563083 | A1 * | 10/1985 | ........... A01M 23/06 |
| FR | 2582479 | | 12/1986 | |
| FR | 2582479 | A1 * | 12/1986 | ........... A01M 23/04 |
| FR | 2753880 | | 4/1998 | |
| FR | 2753880 | A1 * | 4/1998 | ........... A01M 23/04 |
| GB | 160608 | A * | 3/1921 | ........... A01M 23/18 |
| GB | 2085704 | A * | 5/1982 | ........... A01M 23/18 |
| GB | 2095087 | A * | 9/1982 | ........... A01M 23/18 |
| JP | H0570280 | U * | 9/1993 | |
| JP | 3160975 | | 7/2010 | |
| JP | 3160975 | U * | 7/2010 | |
| WO | 8800008 | | 1/1988 | |
| WO | WO-8800008 | A1 * | 1/1988 | ........... A01M 1/103 |
| WO | WO-8808247 | A1 * | 11/1988 | ........... A01M 23/18 |
| WO | 2014203166 | | 12/2014 | |
| WO | WO-2014203166 | A1 * | 12/2014 | |

OTHER PUBLICATIONS

Plan Life, "Plank Mouse Trap—Humane Bucket Rat Traps—Walk The Plank Automatic Reset Mouse Killer for Mice & Other Pests & Rodents", Amazon.com, Aug. 20, 2017, https://www.amazon.com/PLAN-LIFE-Plank-Mouse-Trap/dp/B0747BDGMZ/ref=cm_cr_arp_d_product_top?ie=UTF8.

Shawn Woods, "The All Time Best Mouse Trap I Have Ever Tested. Walk The Plank Mouse Killer Trap In Action", Youtube.com, Jul. 2, 2018, https://www.youtube.com/watch?v=nsoVcrFyrF8&feature=youtu.be.

(56) References Cited

OTHER PUBLICATIONS

Rickey Mouse Co. LLC, "Teeter Totter Trap", www.tttrap.com, Sep. 2017, https://www.tttrap.com.

Lee W. Young, "PCT International Search Report", dated Dec. 7, 2018 for application No. PCT/US2018/45963, United States Patent and Trademark Office, Alexandria, Virginia.

Lee W. Young, "PCT Written Opinion", dated Dec. 7, 2018 for application No. PCT/US2018/45963, United States Patent and Trademark Office, Alexandria, Virginia.

* cited by examiner

ANIMAL TRAP

CROSS REFERENCE TO RELATED APPLICATIONS

This application is a Continuation-in-Part of pending U.S. patent application Ser. No. 15/683,142, filed Aug. 22, 2017, entitled ANIMAL TRAP, which is hereby incorporated by reference in its entirety.

TECHNICAL FIELD

The present invention relates to animal traps; more particularly, to animal traps for use with open ended buckets; and most particularly, to non-lethal animal traps for use with standard sized buckets wherein the trap includes a plank and fulcrum feature configured to deposit an animal, such as for example a mouse or rat, within the bucket upon tipping of the plank wherein the components of the trap are designed to snap together without fasteners or tools.

BACKGROUND OF THE INVENTION

Traps have long been used to control rodent infestation. Typically, such traps may be segregated between lethal and non-lethal varieties, each possessing its own positives and negatives.

By way of example, one variety of lethal rodent traps may be generally described as spring traps. In this type of trap, a jaw or bar is spring-loaded to an open position. Bait is then placed within the opening in order to entice the rodent into the path of the jaw or bar. Once a rodent approaches the bait, the spring tension is released thereby causing the jaw or bar to snap to a closed position which crushes the rodent or breaks the rodent's neck or back. The dead rodent can then be discarded and the jaw/bar reset to trap another rodent. While effective at controlling rodent infestation, these lethal traps suffer significant drawbacks. First, the lethality of these traps may be upsetting or offensive to some members of the general population. Second, removal and resetting of the trap may require handling of the rodent or trap components directly contacted by the rodent. Such contact may enable spread of contagions, such as mites that may have been living on the rodent.

Alternative, non-lethal animal traps have also been developed as a purportedly "more humane" method of rodent control. Non-lethal animal traps generally employ a cage-like member that may be triggered so as to encapsulate an animal. In one alternative, the cage is suspended or propped above a piece of bait. Once the animal approaches the bait, the cage is lowered to thereby entrap the animal. In a second alternative, a stationary cage may include a one-way entry into the cage body. That is, the trap may be configured to receive bait within the cage such that an animal can then freely enter the cage to retrieve the bait. However, once inside the cage, the animal is prevented from exiting to trap due to the trap design. While not harming the animal, such traps must be monitored regularly to determine if an animal has been trapped. Failure to monitor the traps may cause trapped animals to slowly suffocate, starve or die of dehydration—all of which may be considered by some to be more inhumane than the substantially instantaneous death of the animal resulting from the above-referenced lethal traps. Also, failure to properly relocate a trapped animal may enable the trapped animal to re-infest the location.

It is also known to fashion a rodent trap using a pail or bucket to catch and trap the rodent. In this type of trap, a metal or wood platform strip is loosely laid across a lip of the pail or bucket so that an end of the strip is suspended over its opening. Bait is placed on the suspended end of the strip so that a rodent will traverse the strip to reach the bait. As the rodent progresses along the platform strip, the strip tips to drop the rodent into the pail or bucket. The deep sidewalls of the pail or bucket prevent the rodent from climbing or jumping out. If desired, the captured rodent can then be released. Heretofore, these traps have been subject to a number of potential drawbacks. For instance, objects external to the pail or bucket must be used to properly place the strip in reference to the pail or bucket. Also, when the strip is loosely placed on the lip of the pail or bucket, care must be taken not to disturb the set up so as to avoid upsetting the balance of the strip. Further, activity of the rodent as it approaches the strip or bait may upset the balance as well. Additionally, these traps may be single-use traps whereby only a single rodent may be trapped before requiring manual resetting of the platform and/or bait.

Accordingly, what is needed in the art is an animal trap which addresses the above recited limitations in the art.

SUMMARY OF THE INVENTION

Briefly described, an animal trap apparatus is designed with simple molded components that may be assembled without fasteners, tools or glue. The animal trap apparatus may be configured to be mounted onto a rim of a bucket where the bucket has a sidewall and closed bottom defining a cavity for receiving an animal. The animal trap apparatus may comprise a plank having a top surface, a bottom surface and opposing sides. The plank may further include a bait receiving end and a mounting end, with a fulcrum feature therebetween. A bracket having a notch may be adapted to receive the rim of the bucket to thereby mount the bracket on the bucket. The bracket may also include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end extends over the cavity of the bucket. Thus, the plank is configured to pivot about the fulcrum feature in a forward direction when an animal approaches the bait receiving end to thereby place the animal trap apparatus in a tripped condition whereby the bait receiving end is in a tripped position and extends downwardly toward the closed bottom of the bucket. In this manner, the animal may be deposited within the bucket. Additionally, the notch may be configured to include a stepped profile adapted to receive bucket rims of varying thicknesses. Further, the position of the plank may be biased toward the loaded position by a spring.

In an aspect of the present invention, the bracket included within the animal trap apparatus may comprise opposing first and second side panels where each side panel defines a respective receiving feature and a respective notch. The side panels may further define a bait receiving end slot and a mounting end slot arranged on either side of each panel's respective notch. The bracket may also include opposing first and second end braces where each end brace has first and second grooves. The first and second grooves of the first end brace may be configured to be received within respective bait receiving end slots of the first and second side panels. The first and second grooves of the second end brace may be configured to be received within respective mounting end slots of the first and second side panels. In this manner, the first and second side panels may be arranged in parallel spaced relation to one another. Each slot may further include a ledge configured to lockingly receive the end brace. The second end brace may also include an upwardly extending tongue portion configured to minimize or prevent reverse pivoting of the plank in an opposing reverse direction when the animal trap apparatus is in the loaded position.

In a further aspect of the invention, the fulcrum feature may comprise a pair of opposing posts, a respective post extending outwardly from a respective plank side. The posts are configured to pivotally reside within the notch of the side panels. The posts may be positioned toward the bait receiving end proximate the median of the plank and the bait receiving end may be configured to receive a bait without pivoting in the first direction when the animal trap apparatus is in the loaded position. The plank may further autonomously reverse pivot in an opposing second direction to return the animal trap apparatus to the loaded condition after the plank has pivoted to the tripped position.

A further embodiment of an animal trap apparatus may comprise a plank having a top surface, a bottom surface and opposing sides with the plank including a bait receiving end and a mounting end and a fulcrum feature therebetween. The bait receiving end may be loaded with a bait. A bracket having a notch may be adapted to receive the rim of the bucket to thereby mount the bracket on the bucket. The bracket may further include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end and bait extends over the cavity of the bucket. The plank is configured to pivot about the fulcrum feature in a forward direction when an animal approaches the bait thereby placing the animal trap apparatus in a tripped condition whereby the bait receiving end is in a tripped position and extends downwardly toward the closed bottom of the bucket. In this manner, the animal is deposited within the bucket.

In a further aspect of the present invention, the bait may be fixedly secured to the top face of the plank whereby the bait does not become dislodged when the plank is in the tripped position. The plank may then autonomously reverse pivot in an opposing second direction to return the animal trap apparatus to the loaded condition after the plank has pivoted to the tripped position.

Yet another embodiment of an animal trap apparatus may comprise a bucket including a sidewall having an open top edge defined by a rim and a closed bottom, the sidewall and closed bottom defining a cavity for receiving an animal. The apparatus may further include a plank having a top surface, a bottom surface and opposing sides where the plank includes a bait receiving end and a mounting end, with a fulcrum feature therebetween. A bracket having a notch adapted to receive the rim of the bucket to thereby mount the bracket on the bucket may be included. The bracket may further include a receiving feature configured to receive the fulcrum feature. When the animal trap apparatus is in a loaded condition, the plank is in a loaded position whereby the mounting end of the plank extends generally horizontally outwardly from the bucket sidewall and the bait receiving end extends over the cavity of the bucket. The plank may then be configured to pivot about the fulcrum feature in a forward direction when an animal approaches the bait receiving end thereby placing the animal trap apparatus in a tripped condition whereby the bait receiving end is in a tripped position and extends downwardly toward the closed bottom of the bucket. In this manner, the animal may be deposited within the bucket, such as a 5 gallon bucket.

In yet a further aspect of the invention, an animal trap apparatus may be comprised of a plank having a top surface, a bottom surface and opposing sides where the plank includes a first end and a second end opposite the first end, with a fulcrum feature therebetween. The fulcrum feature may comprise a pair of opposing posts extending outwardly from respective plank sides, the opposing posts having non-circular cross sections having post widths greater than post lengths. The apparatus may further include a bracket having a receiving feature configured to receive the fulcrum feature. The bracket includes opposing first and second side panels, wherein each side panel includes an edge having a respective post receiving feature, wherein each post receiving feature defines a post opening having a post opening width, wherein each post opening includes a protrusion partially occluding said post opening and defining a narrowed opening width that is less than the post opening width and wherein the width of the post opening is greater that the post width and the narrowed width of the post opening is less that the post width and greater than the post length.

In yet a further aspect of the invention, each component of the animal trap apparatus is formed of a food-grade material.

In yet a further embodiment in accordance with the invention a method of assembling an animal trap apparatus is provided including the steps of: providing trap components including a plank, first and second side panels and first and second end braces; and connecting in any order the plank, first and second side panels and first and second end braces to form the animal trap apparatus.

In a further embodiment of the method of assembly, two or more of the traps components are provided in the form of a parts rack followed by the step of removing two or more trap components from the parts rack before connecting the two or more trap components.

BRIEF DESCRIPTION OF THE DRAWINGS

The above-mentioned and other features are advantages of this invention, and the manner of attaining them, will become apparent and be better understood by reference to the following description of the invention in conjunction with the accompanying drawings, wherein.

DESCRIPTION OF THE PREFERRED EMBODIMENTS

Figure 1:
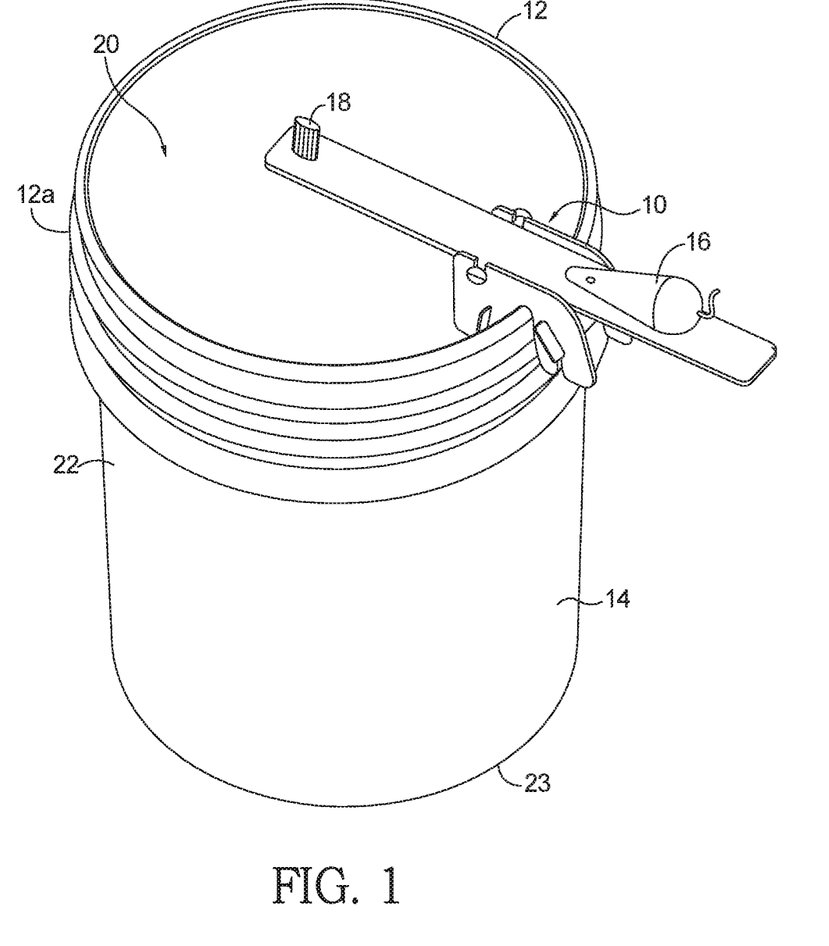
FIG. 1 is a perspective view of an embodiment of an animal trap apparatus in accordance with an aspect of the present invention, the animal trap apparatus being mounted onto a bucket.

Referring to the drawings in detail, and specifically to FIG. 1, an animal trap apparatus 10 is shown that is designed with simple components that may be assembled without fasteners, tools or glue. Animal trap apparatus 10 may be mounted onto a rim 12 of bucket 14. An animal 16, such as for example a mouse, may then attempt to retrieve bait 18 whereby animal 16 falls into, and is trapped within, cavity 20 defined by sidewall 22 and bottom 23 (see FIG. 8) of bucket 14, as will be discussed in greater detail below.

Figures 2, 3, 3A, 3B:
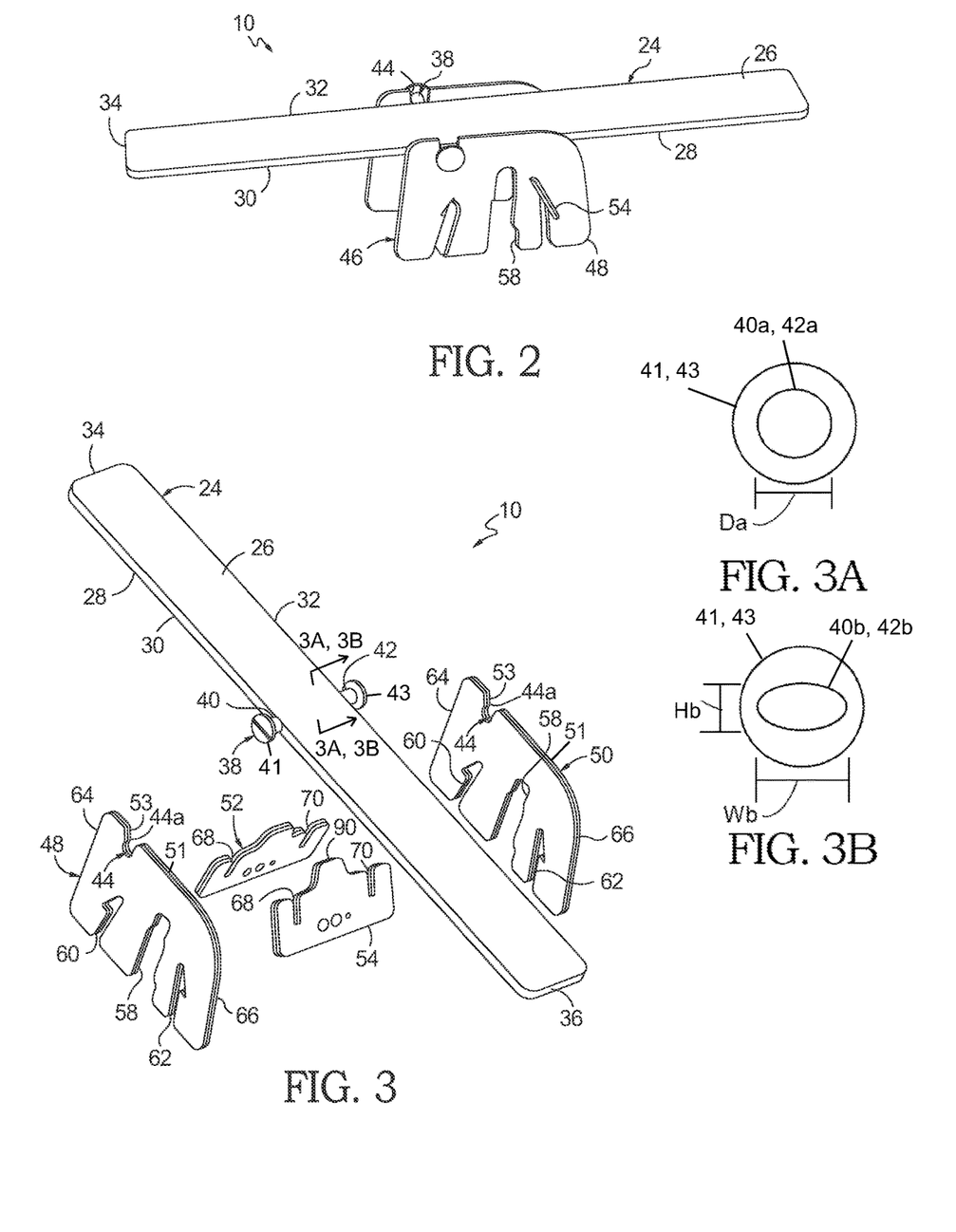
FIG. 2 is a perspective view of the animal trap apparatus shown in FIG. 1.
FIG. 3 is an exploded view of the animal trap apparatus shown in FIG. 2.
FIG. 3A is a cross section view of an embodiment of a post suitable for use within the animal trap apparatus shown in FIG. 1.
FIG. 3B is a cross section view of an alternative embodiment of a post suitable for use within the animal trap apparatus shown in FIG. 1.
Figures 4, 5:
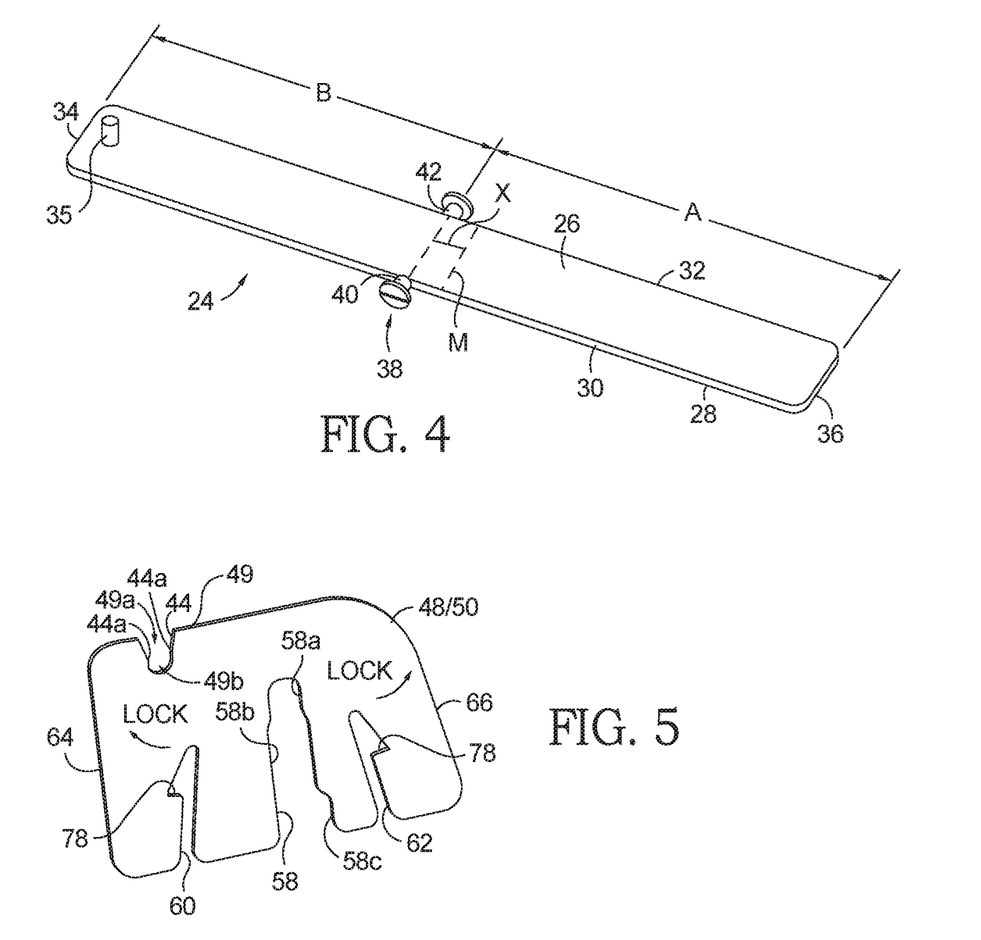
FIG. 4 is an isolated view of an embodiment of a plank used within the animal trap apparatus in FIG. 2.
FIG. 5 is an isolated view of an embodiment of a side panel used within the animal trap apparatus in FIG. 2.
Figure 7:
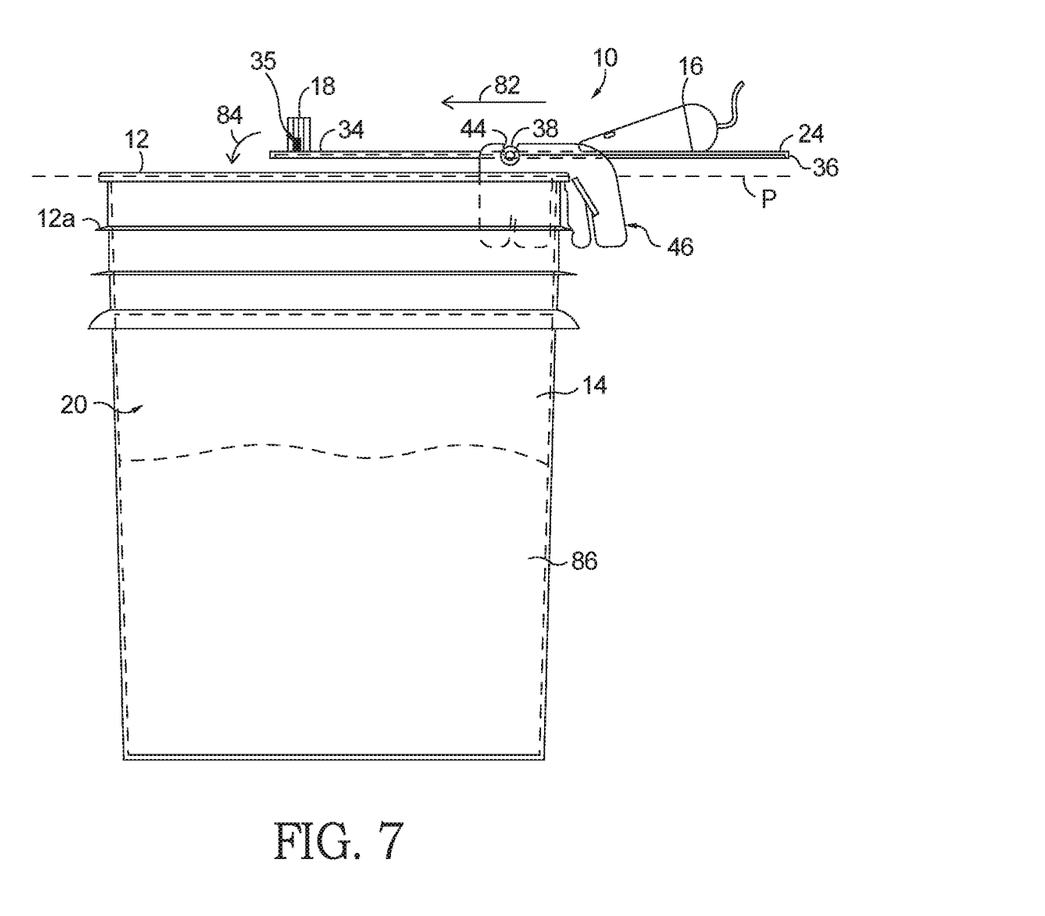
FIG. 7 is a side view of the animal trap apparatus shown in FIG. 1 mounted onto a bucket in a loaded condition with an animal at the mounting end of the plank and the bucket optionally filled with water.
Figure 8:
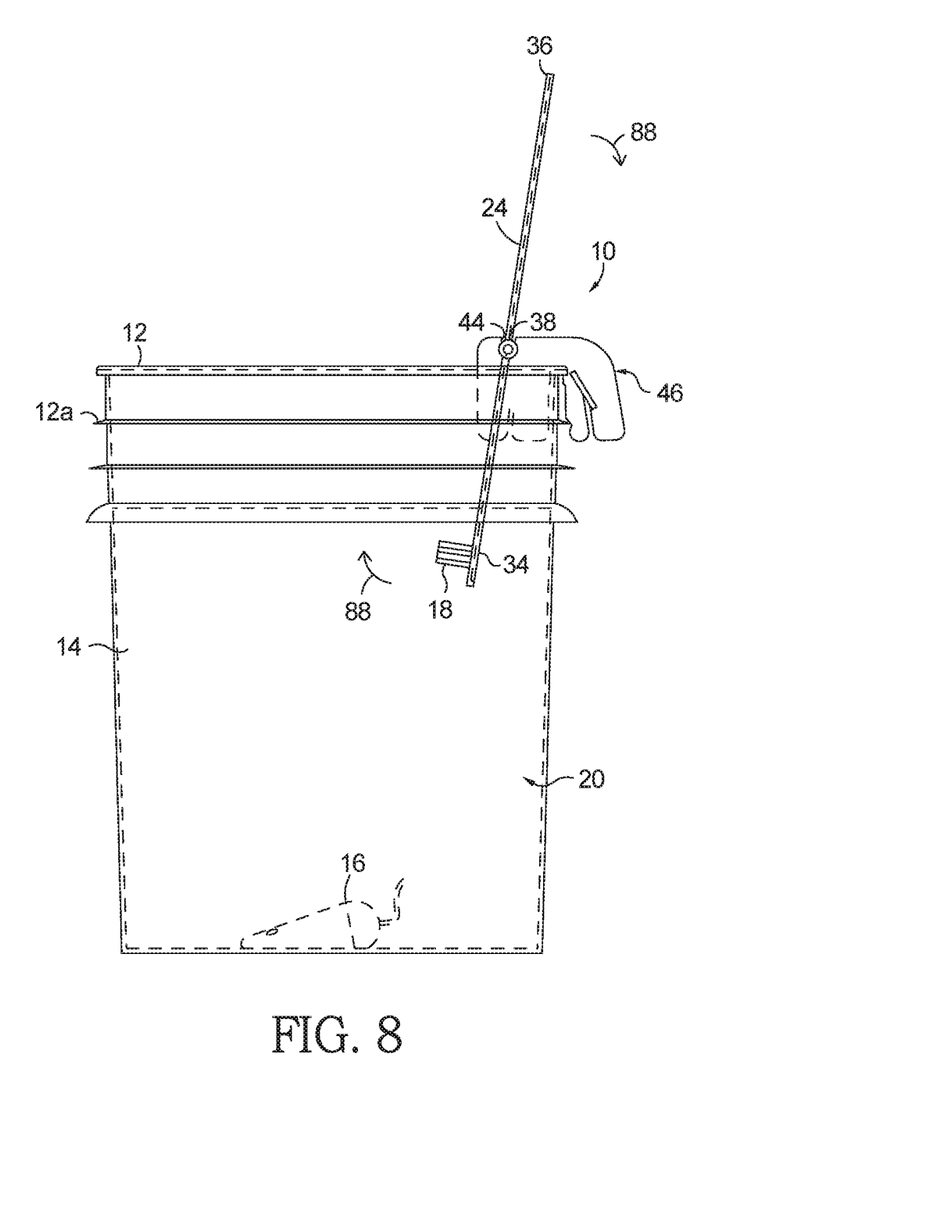
FIG. 8 is a side view of the animal trap apparatus shown in FIG. 1 mounted onto a bucket in a tripped condition with the plank tripped and the animal trapped within the empty bucket.

Turning now to FIGS. 2 through 6, animal trap apparatus 10 may be generally comprised of a plank 24 having a top surface 26, bottom surface 28 and opposing sides 30, 32. Plank 24 may further include a first receiving end 34 for receiving bait and a second end 36 opposite the first end, with a fulcrum feature 38 disposed therebetween. With reference to FIGS. 3 and 4, fulcrum feature 38 may comprise a pair of opposing posts 40, 42 extending outwardly from respective plank sides 30, 32. Posts 40, 42 may optionally include respective head portions 41, 43. Posts 40, 42 of plank 24 may be configured to pivotally mount within a receiving feature 44 such as for example, a recess, on a bracket 46. Posts 40, 42 may also be positioned toward bait receiving end 34 a spaced distance X from plank median M (see FIG. 4) so that plank portion A weighs more than plank portion B when bait 18 is secured to receiving end 34 of plank 24 by bait securing feature 35 such as, for example, a pin extending from top surface 26 of plank 24. In this manner, when situated generally horizontal, as shown in FIG. 7, plank 24 may autonomously reverse pivot to return plank 24 to a loaded position (as shown in FIG. 7) after plank 24 has pivoted to a tripped position (as shown in FIG. 8). Optionally, a spring (not shown) may be provided, such as a torsion spring imposed about one or both opposing posts 40, 42, to bias plank 24 toward the loaded position to further offset the weight of the secured bait.

With reference to FIGS. 3A and 3B, posts 40, 42 may be fabricated to have a variety of cross sections. In one aspect of the present invention, at least a portion of posts 40, 42 comprises a smooth curve to promote pivoting of plank 24. As shown in FIG. 3A, posts 40a, 42a may have a generally circular cross section with a diameter Da. Alternatively, as shown in FIG. 3B, posts 40b, 42b may have a generally oval, elliptical or otherwise oblong cross section, generally defined herein as being non-circular, having a width Wb greater than its height Hb. In one aspect, length Wb is oriented so as to lie along the longitudinal plane defined by plank 24. It should be noted that any reference to posts 40, 42 may include posts 40a, 42a and/or posts 40b, 42b unless specifically stated otherwise.

Figure 6:
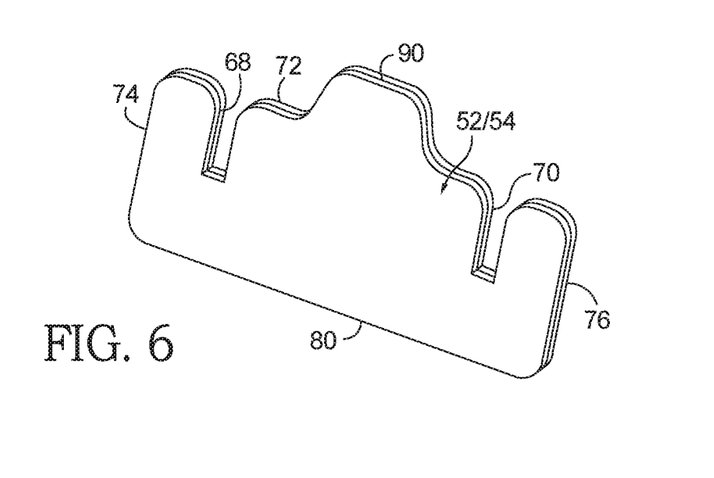
FIG. 6 is an isolated view of an embodiment of an end brace used within the animal trap apparatus in FIG. 2.

Bracket 46 as shown in FIGS. 3, 5 and 6, may be comprised of subcomponent components (side panels 48, 50 and first and second end braces 52, 54) which may be assembled without tools to form a completed bracket 46. As seen most clearly in FIG. 3, and with further reference to FIG. 5, opposing first and second side panels 48, 50 each define a respective open ended receiving feature 44, open at edge 49 of each side panel 48, 50, and is configured to pivotally receive fulcrum feature 38 therein, as described above.

Figure 9:
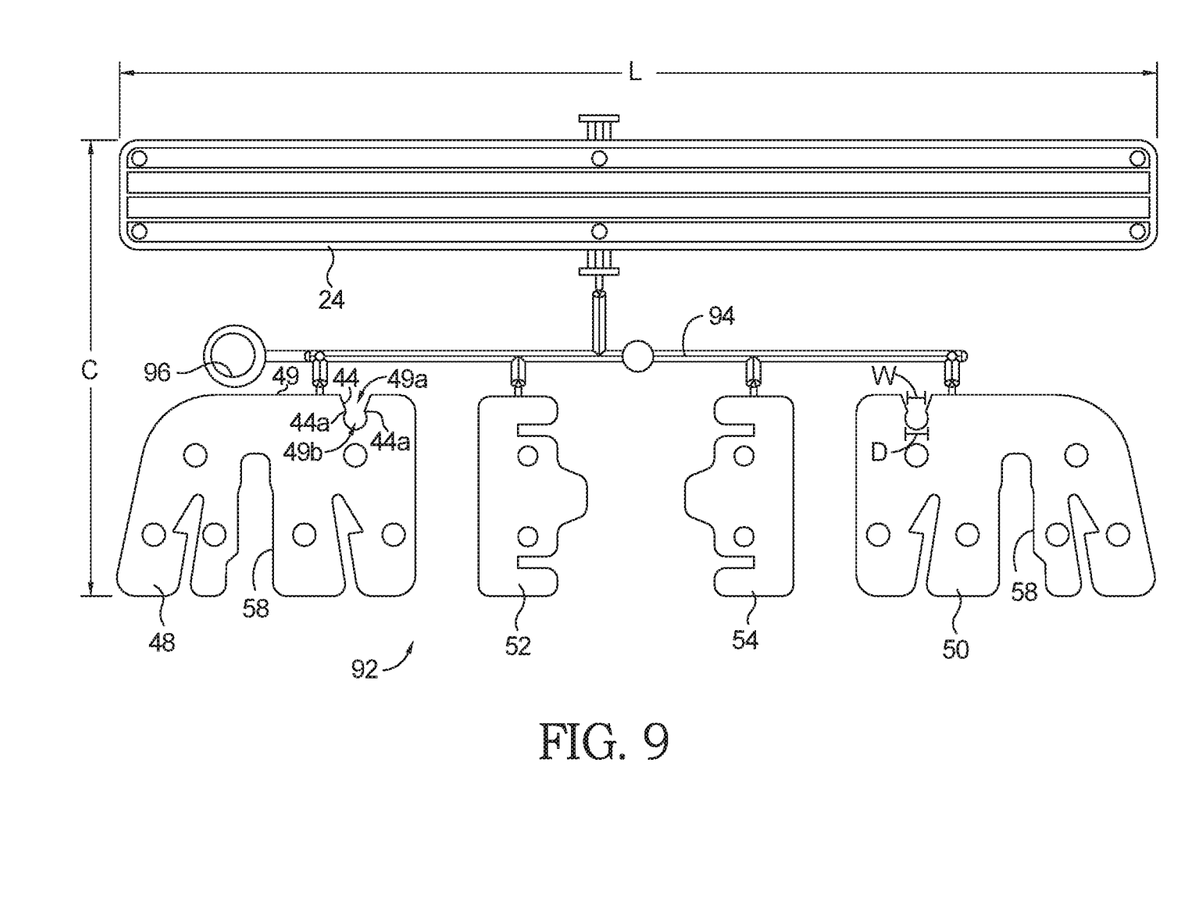
FIG. 9 is a side view of a trap parts rack containing the components of the animal trap apparatus shown in FIG. 1 in accordance with the invention.
Figure 9A:
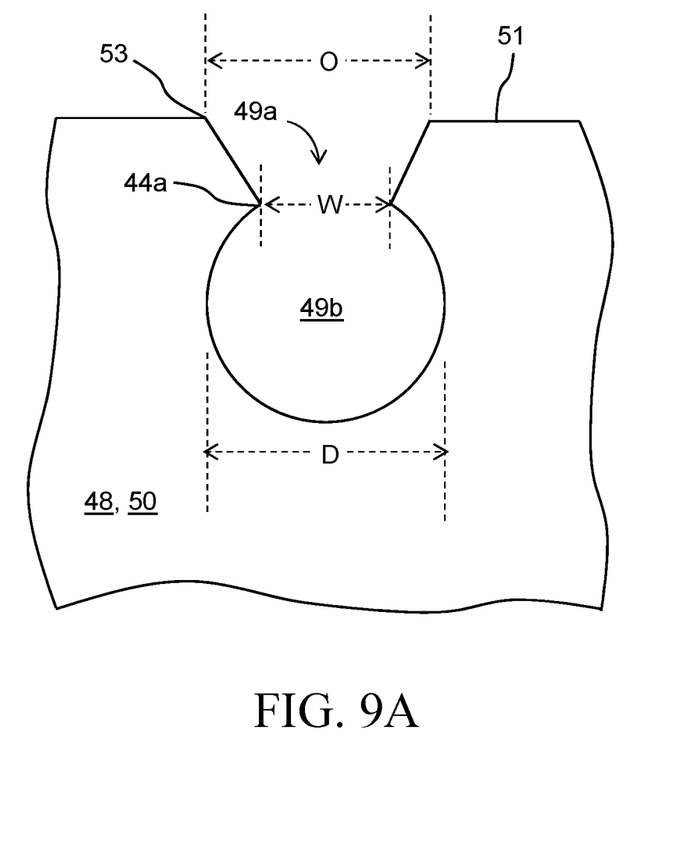
FIG. 9A is an enlarged, particulay broken away, view of a side panel of the trap parts rack shown in FIG. 9.

In a further aspect of the present invention and with further reference to FIGS. 9 and 9A, receiving feature 44 may include an open-ended, circular post opening 49b having an opening width D. Receiving feature 44 extends to edge 51 of side panels 48, 50 to form entry opening 53. One or more protrusions 44a may also be located proximate circular post opening 49b whereby protrusions 44a may partially occlude circular post opening 49b so as to form a narrowed opening 49a having a width W, wherein width W is less than width D. The width O of entry opening 53 of receiving feature 44 is wider than width W of narrowed opening 49a, forming a transition between entry opening 53 and narrowed opening 49a. In one aspect of the present invention, width W of narrowed opening 49a may be proportioned such that posts 40a, 42a (see FIG. 3A) must snuggly pass through narrowed opening 49a before coming to rest in post opening 49b. That is, diameter Da of posts 40a, 42a is slightly greater than width W but less than post opening diameter width D.

In a further aspect of the present invention, width O of entry opening 53 and width W of narrowed opening 49a may be proportioned such that height Hb of posts 40b, 42b (see FIG. 3B) passes through entry opening 53 and narrowed opening 49a while width Wb is too great to pass through narrowed opening 49a. Height Hb, however, is slightly less than width W. Thus, when assembly animal trap apparatus 10, plank 24 is rotated such that posts 40b, 42b are oriented for passage of height Hb through narrowed opening 49a before coming to rest in post opening 49b. Pivoting of plank 24 causes width Wb to interfere with protrusions 44a such that plank 24 is pivotally secured within side panels 48, 50.

From the above, is should be readily apparent that posts 40, 42, having a smooth curved surface, may freely pivot within a respective post opening 49b while protrusions 44a prevent unwanted removal or dislodgement of plank 24 from bracket 46.

Each side panel 48, 50 may further define a respective notch 58 configured to receive rim 12 of bucket 14 so as to mount bracket 46 onto bucket 14. Notch 58 may include a stepped channel profile defining notches of varying widths, such as notches 58a-58c (see FIG. 5), so as to accommodate bucket rims of varying thickness and/or annular rings 12a formed on sidewall 22 (FIGS. 1, 7 and 8). Each side panel 48, 50 may also include a respective bait receiving end slot 60 and respective mounting end slot 62 proximate respective side panel edges 64, 66. Note that side panels 48, 50 may be identical in shape and size.

Opposing side panels 48, 50 may be generally arranged in spaced parallel relation to one another by way of a pair of opposing first and second end braces 52, 54. With reference to FIGS. 3 and 6, each end brace 52, 54 may include respective first and second grooves 68, 70 depending downwardly from brace top wall 72 proximate respective brace side edges 74, 76. In this manner, first end brace 52 may be configured to mount with side panels 48, 50 through a sliding engagement of grooves 68, 70 with bait receiving end slots 60 of each side panel 48, 50. Similarly, second end brace 54 may be configured to mount with side panels 48, 50 through a sliding engagement of grooves 68, 70 with mounting end slots 62 of each side panel 48, 50. Once assembled, side panels 48, 50 and end braces 52, 54 may generally form bracket 46 as a generally rectangular member. Each slot 60, 62 within side panels 48, 50 may be further configured to define a ledge 78 within side panels 48, 50. End braces 52, 54 may be configured to rotate within slots 60, 62 such that bottom edge 80 of each end brace 52, 54 is lockingly received by the respective ledge 78 (see e.g., FIGS. 2, 7 and 8). Note that end braces 52, 54 may be identical in shape and size.

Operation of an embodiment of animal trap apparatus 10 is shown generally in FIGS. 7 and 8. As shown in FIG. 7, once assembled, bracket 46 of animal trap apparatus 10 and plank 24 are mounted onto rim 12 of bucket 14 so as to place animal trap apparatus 10 in a loaded condition. That is, fulcrum feature 38 of plank 24 is mounted into receiving feature 44 of bracket 46 such that plank 24 rests in a generally horizontal plane with respect to the ground. With bucket 14 placed on a relatively flat, level surface, plank 24 may rest in a parallel relationship with the plane P defined by rim 12. Bait 18 may be secured to plank 24 proximate the terminal end of bait reciting end 34. As described above, fulcrum feature 38 may be positioned along the length of plank 24 so as maintain the horizontal orientation of plank 24 upon charging of bait 18. Animal 16 may then mount plank 24 at mounting end 36 and proceed in a forward direction generally designated by direction 82 toward bait 18. As animal 16 continues in direction 82 and travels past fulcrum feature 38, plank 24 pivots about fulcrum feature 38 in a forward direction generally designated by arrow 84 to place animal trap apparatus in a tripped condition, and plank 24 in a tripped position, as shown in FIG. 8. With plank 24 in the tripped position, animal 16 falls from plank 24 into cavity 20 of bucket 12. Bucket 12 may either be filled with water 86 (FIG. 7) or left empty (FIG. 8) at the discretion of the trap apparatus user.

As shown in FIG. 8, after animal 16 has fallen into bucket 12, plank 24 may autonomously reverse pivot generally in the direction designated by arrow 88 until plank 24 is returned to the loaded position and animal trap apparatus 10 to the loaded condition as shown in FIG. 7. As further shown in FIG. 8, in accordance with an aspect of the present invention, bait 18 may be fixedly secured to bait receiving end 34 such that bait 18 remains on plank 24 and does not fall into cavity 20 when plank 24 pivots to the tripped position. In this manner, animal trap apparatus 10 may autonomously cycle between loaded and tripped conditions upon mounting of serial animal 16. It should be further noted that plank 24 may be prevented from pivoting in reverse direction 88 past plane P (FIG. 7) upon mounting of animal 16 through an interference between plank 24 and rim 12. Additionally or alternatively, second end brace 54 may further include an upwardly extending tongue portion 90 (see FIGS. 3 and 6) that may engage with bottom surface 28 of plank 24 proximate mounting end 36 to minimize or prevent reverse pivoting of plank 24 in direction 88 beyond plane P as shown in FIG. 7. Note that, for commonality of part design, both braces 52, 54 may include tongue 90.

It should be noted that the animal trap as herein described is scalable. That is, while depicted as a trap for small animals such as mice, the individual trap components may be sized as needed to be assembled as an animal trap for larger animals such as rats, squirrels, raccoons, etc. Once bracket 46 is assembled with its separate components 48, 50, 52 and 54, it becomes a structurally rigid assembly.

With respect to the overall configuration of the component that comprise trap apparatus 10, each component may be molded of plastic or other light weight material, one or more of the components being connected together into a rack by molding sprues for compact packaging and storage.

In accordance with an aspect of the present invention, each component of trap apparatus 10 is constructed of a food-grade material, such as but not limited to high density polyethylene (HDPE), polyethylene terephthalate (PET), polypropylene (PP), polycarbonate (PC) and blends thereof. In this aspect, food-grade material is used such that trap apparatus 10 complies with local, state and/or federal farming regulations (i.e., for use with traps to be located in or around a farm or barn).

Referring to FIG. 9, an exemplar trap parts rack 92 containing all of the components needed to compete assembly of trap apparatus 10 are shown. Trap parts rack 92 includes plank 24, side panels 48, 50 and end braces 52, 54, all connected together by molding sprue 94 to form parts rack 92. Trap parts rack 92 thus provides for compact packaging for shipping and storage purposes. For example, parts rack 92 formed to provide the components for an animal trap apparatus suitable for trapping mice, dimension C may be approximately less than 6¼ inches and dimension L may be approximately less than 13¼ inches. The thickness of the molded components may be selected to provide the strength and rigidity needed of the trap apparatus to perform its function. In the case of an apparatus suitable for trapping mice, the thickness of the formed rack may be approximately less than ½ inch. Optional end hook 96 may be contiguously formed with rack 92 to provide a convenient way to feature the trap apparatus in a commercial setting or to hang on a hook or nail on a wall ready for use.

A method of assembling animal trap apparatus in accordance with the invention may include the steps of: providing trap components 24, 48, 50, 52 and 54; and connecting in any order trap components 24, 48, 50, 52 and 54 to form animal trap apparatus 10.

In a further embodiment of the method of assembly, two or more of trap components 24, 48, 50, 52 and 54 may be provided in the form of a parts rack (see FIG. 9 where an exemplar rack containing all trap components is shown as parts rack 92) followed by the step of removing two or more trap components from the parts rack before connecting the two or more trap components.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An animal trap apparatus comprising a collection of individual components, said components comprising:
   a) a plank having a top surface, a bottom surface and opposing sides, said plank including a first end and a second end, with a fulcrum feature therebetween, wherein said fulcrum feature comprises a pair of opposing posts, a respective post of said opposing posts extending outwardly from a respective one of said opposing sides and including a non-circular cross section having a post width greater than a post height; and
   b) a bracket comprising first and second end braces and opposing first and second side panels, wherein said first and second end braces include respective first and second grooves and said first and second side panels include respective first and second end slots, wherein each of said side panels includes an edge having a respective post receiving feature, wherein each of said post receiving features defines a post opening having a post opening width, wherein each of said post openings includes a protrusion partially occluding said post opening and defining a narrowed opening width less than said post opening width, wherein said post receiving feature is configured to receive said fulcrum feature, wherein said width of said post opening is greater that said post width and said narrowed opening width of said post opening is less than said post width and greater than said post height, wherein said first and second end slots of said first side panel are configured to receive the respective first grooves of said first and second end braces, and wherein said first and second end slots of said second side panel are configured to receive the respective second grooves of said first and second end braces.

2. The animal trap apparatus in accordance with claim 1 wherein each component of said collection of components is formed of a food-grade material.

3. The animal trap apparatus in accordance with claim 2 wherein said food-grade material is selected from a group consisting of a high density polyethylene (HDPE), a polyethylene terephthalate (PET), a polypropylene (PP), a polycarbonate (PC) and blends thereof.

4. An animal trap apparatus comprising a collection of individual components, said components comprising:
   a) a plank having a top surface, a bottom surface and opposing sides, said plank including a first end, a second end, and a fulcrum feature positioned between said first end and said second end, wherein said fulcrum feature comprises a pair of opposing posts, a respective one of said opposing posts extending outwardly from a respective one of said opposing sides and including an oval or elliptical cross section having a post width greater than a post height; and
   b) a bracket comprising opposing first and second side panels, wherein each of said first and second side panels include an edge having a respective post receiving feature, wherein each said post receiving feature defines a circular post opening, a narrowed opening partially occluding said circular post opening, and an entry opening, wherein said entry opening is open to said respective side panel edge, wherein said circular post opening has a width D, said narrowed opening has a width W, and said entry opening has a width O, wherein said width W is less than said width D, and wherein said width W is less than said width O and wherein said post receiving feature is configured to receive said fulcrum feature, wherein said width D is greater than said post width, wherein said width W is less than said post width, and wherein said width W is greater than said post height.

5. The animal trap apparatus in accordance with claim 4 wherein each opposing post of said pair of opposing posts includes a head portion.

6. The animal trap apparatus in accordance with claim 4 wherein each component of said collection of components is formed of a food-grade material.

7. The animal trap apparatus in accordance with claim 6 wherein said food-grade material is selected from a group consisting of a high density polyethylene (HDPE), a polyethylene terephthalate (PET), a polypropylene (PP), a polycarbonate (PC) and blends thereof.

8. The animal trap apparatus in accordance with claim 4 wherein said collection of individual components are configured to be assembled without fasteners to form said animal trap apparatus, wherein said bracket includes first and second end braces, wherein said first and second side panels of said bracket include respective first and second end slots, wherein said first and second end braces include respective first and second grooves, wherein said first and second end slots of said first side panel are configured to receive the respective first grooves of said first and second end braces, and wherein said first and second end slots of said second side panel are configured to receive the respective second grooves of said first and second end braces.

9. The animal trap apparatus in accordance with claim 8 wherein each component of said collection of components is formed of a food-grade material.

10. The animal trap apparatus in accordance with claim 9 wherein said food-grade material is selected from a group consisting of a high density polyethylene (HDPE), a polyethylene terephthalate (PET), a polypropylene (PP), a polycarbonate (PC) and blends thereof.

\* \* \* \* \*